UNITED STATES PATENT OFFICE.

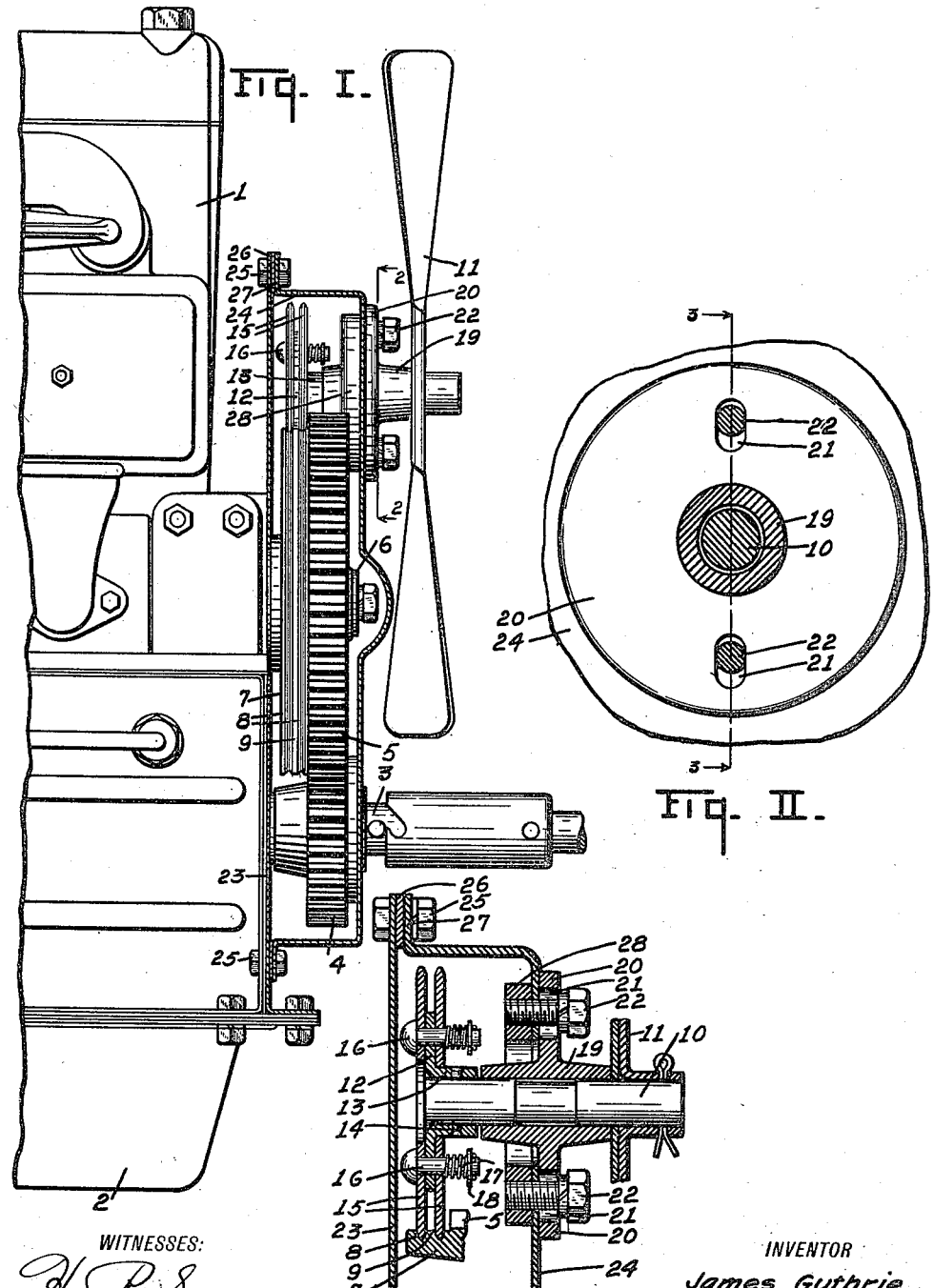

JAMES GUTHRIE, OF JACKSON, MICHIGAN, ASSIGNOR TO BRISCOE MOTOR CO., INC., OF JACKSON, MICHIGAN.

FAN-GEARING FOR INTERNAL-COMBUSTION ENGINES.

1,181,381. Specification of Letters Patent. Patented May 2, 1916.

Application filed July 8, 1915. Serial No. 38,769.

*To all whom it may concern:*

Be it known that I, JAMES GUTHRIE, a citizen of the United States, residing at Jackson, Michigan, have invented certain new and useful Improvements in Fan-Gearing for Internal-Combustion Engines, of which the following is a specification.

This invention relates to improvements in fan gearing for internal combustion engines. My improved gearing is especially designed by me for driving the fans of internal combustion engines and I have shown the same embodied in such a structure.

My improvements are, however, readily adapted and advantageous for use in other relations.

The main objects of my invention are: First, to provide an improved friction gearing adapted for the driving of the fan of an internal combustion engine which is positive and durable and not likely to be rendered inoperative by lubricant. Second, to provide an improved friction gearing embodying these advantages which is simple and compact in structure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail side elevation of a structure embodying the features of my invention, the gearing housing being shown in vertical section. Fig. II is a detail section on a line corresponding to line 2—2 of Fig. I. Fig. III is a detail section on a line corresponding to line 3—3 of Fig. II.

In the drawing similar reference characters refer to similar parts throughout the several views, and the sectional views are taken looking in the direction of the little arrows at the ends of the section lines.

Referring to the drawings, 1 represents an internal combustion engine and 2 the crank thereof. The crank shaft 3 of the engine projects from the crank casing 2 and is provided with a pinion 4. This pinion meshes with a gear 5 revolubly mounted on a shaft 6. On the inner side of this gear 5 is a friction disk 7 having a pair of spaced peripheral grooves 8 and a peripheral rib 9 between the grooves.

A shaft 10 is provided for the fan 11, which may be of any suitable design or construction. On the inner end of this shaft 10 is a flange 12, the flange being provided with a hub portion 13 and secured to the shaft by means of the pin 14 arranged through this hub portion.

A pair of driven friction disks 15 are arranged, one at each side of the flange 12, to engage the grooves 8 of the driving friction disk 7. The disks 15 are supported by pins 16 arranged through the disks and the flange. Coiled springs 17 are arranged on these pins so that the disks are yieldingly supported axially. The pins are provided with washers 18 for supporting the outer ends of the springs.

The bearing 19 for the fan shaft is provided with a supporting flange 20 having slots 21 therein through which the supporting screws 22 are arranged so that the shaft may be adjusted laterally to bring the disk 15 into proper engagement with the driving disk 7 and to compensate for wear.

The housing for the gearing consists of an inner or back plate 23 secured upon the crank shaft casing and an outer member 24 secured to the inner plate by means of the bolts 25, a packing 26 being arranged between the attaching flanges 27 of the outer member and the inner plate. An annular supporting member 28 is secured to the outer housing member to receive the bearing supporting screws 22.

My improved fan driving gearing is compact and durable and at the same time is positive and not rendered inoperative by lubricant. The driven disks 15 being yieldingly supported axially adjust themselves to the grooves in the driving disk and have effective driving engagement therewith. The driven shaft can be adjusted laterally to bring the disks into proper driving engagement when the structure is assembled and also to compensate for wear. The gearing is very durable and practically noiseless in its operation.

I have illustrated and described my improvements in a simple and practical embodiment. I have not attempted to illustrate or describe various modifications which I contemplate as I believe the disclosure made will enable those skilled in the art to which my invention relates to embody or adapt the same as conditions may require.

Having thus described my invention, what I claim as new and desire to secure by Letters Patent, is:

1. In a structure of the class described, the combination of a driving shaft, a pinion on said driving shaft, a gear meshing with said pinion, a driving friction disk having peripheral grooves and a peripheral rib between the grooves secured on the inner side of said gear, a driven shaft provided with a flange, a pair of driven friction disks disposed on opposite sides of said flange to engage said grooves in said driving disk, pins arranged through said flange and driven disks, springs on said pins holding said driven disks yieldingly toward said rib on said driving disk, a bearing for said driven shaft provided with a flange having slots therein, a housing comprising an inner plate disposed at the rear of said gears and an outer member secured to said plate and having an opening for said driven shaft, an annular supporting plate mounted within said outer member, and attaching screws for said shaft bearing carried by said supporting member, said screws being arranged in the slots in said driven shaft bearing flange whereby the driven shaft may be adjusted relative to said driving friction disk.

2. In a structure of the class described, the combination of a driving shaft, a pinion on said driving shaft, a gear meshing with said pinion, a driving friction disk having peripheral grooves and a peripheral rib between the grooves secured to said gear, a driven shaft provided with a flange, a pair of driven friction disks disposed on opposite sides of said flange to engage said grooves in said driving disk, pins arranged through said flange and driven disks, springs on said pins holding said driven disks yieldingly toward said rib on said driving disk, a bearing for said driven shaft provided with a flange having slots therein, and attaching screws for said driven shaft bearing arranged in the slots in said driven shaft bearing flange whereby the driven shaft may be adjusted relative to said driving friction disk.

3. In a structure of the class described, the combination with a casing and a driving shaft projecting therefrom, of a pinion on the projecting end of said driving shaft, a gear meshing with said pinion on said driving shaft, a driving friction disk having peripheral grooves and a peripheral rib between the grooves secured on the inner side of said gear, a driven shaft, a pair of driven friction disks mounted on said driven shaft to engage said grooves in said driving disk, said disks being held yieldingly together, a bearing for said driven shaft provided with a flange having slots therein, a housing comprising an inner plate disposed at the rear of said gears and secured to said casing and an outer member secured to said plate and having an opening for said driven shaft, an annular supporting plate mounted within said outer member, and attaching screws for said driven shaft bearing carried by said supporting member, said screws being arranged in the slots in said driven shaft bearing flange whereby the driven shaft may be adjusted relative to said driving friction disk.

4. In a structure of the class described, the combination with a driving shaft, of a pinion on said driving shaft, a gear meshing with said pinion on said driving shaft, a driving friction disk having peripheral grooves and a peripheral rib between the grooves secured to said gear, a driven shaft, a pair of driven friction disks mounted on said driven shaft to engage said grooves in said driving disk, said disks being held yieldingly together, and an adjustable bearing for said driven shaft whereby the driven shaft may be adjusted relative to said driving friction disk.

5. In a structure of the class described, the combination of a driving friction disk having peripheral grooves, a driven shaft provided with a flange, a pair of driven friction disks disposed on opposite sides of said flange of said driven shaft to engage the grooves of said driving disk, pins arranged through said flange and driven disks, springs on said pins yieldingly supporting said driven disks, a bearing for said driven shaft provided with a flange having slots therein, a housing having an opening for said driven shaft, and attaching screws arranged in the slots in said driven shaft bearing flange whereby the driven shaft may be adjusted relative to said driving friction disk.

6. In a structure of the class described, the combination of a driving friction disk having peripheral grooves, a driven shaft provided with a flange, a pair of driven friction disks disposed on opposite sides of said flange of said driven shaft to engage the grooves of said driving disk, pins arranged through said flange and driven disks, and springs on said pins yieldingly supporting said driven disks.

7. The combination of a driven friction disk having peripheral grooves, a driven shaft, a pair of driven friction disks disposed to engage said grooves in said driving disk, means for yieldingly supporting said driven disks axially on said driven shaft, and means for adjusting said disks laterally.

8. The combination of a driving friction disk having peripheral grooves, a driven shaft, a pair of driven friction disks disposed to engage said grooves in said driving disk, and means for yieldingly supporting said driven disks axially on said driven shaft.

In witness whereof, I have hereunto set my hand and seal in the presence of two witnesses.

JAMES GUTHRIE. [L. S.]

Witnesses:
RENNETT R. GRIGSBY,
OTTO KONSTANZER.

Copies of this patent may be obtained for five cents each, by addressing the "Commissioner of Patents, Washington, D. C."